(12) United States Patent
Li

(10) Patent No.: US 6,453,303 B1
(45) Date of Patent: Sep. 17, 2002

(54) AUTOMATED ANALYSIS FOR FINANCIAL ASSETS

(75) Inventor: Bin Li, Westport, CT (US)

(73) Assignee: Westport Financial LLC, Westport, CT (US)

( * ) Notice: Subject to any disclaimer, the term of this patent is extended or adjusted under 35 U.S.C. 154(b) by 94 days.

(21) Appl. No.: 09/640,107

(22) Filed: Aug. 15, 2000

Related U.S. Application Data
(60) Provisional application No. 60/149,066, filed on Aug. 16, 1999.

(51) Int. Cl.[7] ............................................... G06F 17/60
(52) U.S. Cl. ...................................................... 705/36
(58) Field of Search ............................... 705/1, 35, 36, 705/37, 10; 707/10, 100

(56) References Cited

U.S. PATENT DOCUMENTS

| | | | | |
|---|---|---|---|---|
| 5,864,828 A | * | 1/1999 | Atkins | 705/36 |
| 6,018,722 A | * | 1/2000 | Ray et al. | 705/36 |
| 6,078,904 A | * | 6/2000 | Rebane | 705/36 |
| 6,088,676 A | * | 7/2000 | White, Jr. | 705/1 |

FOREIGN PATENT DOCUMENTS

EP        0572281 A1 * 12/1993

OTHER PUBLICATIONS

"Synthetics Offer Investors GIC Allternative", Pensions & Investments, pp 20, ISSN: 0273–5466, May 1992.*
"Planners Must Tailor Mutual Fund Mix to Suit Client", Financial Services Week, pp 23, ISSN: 0895–8440, Aug. 1990.*
"Chart Service Aims To Move Savers' Money Gradually Into Equities", National Underwriter Life & Health, ISSN: 0893–8202, Aug. 1993.*

* cited by examiner

Primary Examiner—Frantzy Poinvil
(74) Attorney, Agent, or Firm—St. Onge Steward Johnston & Reens LLC

(57) ABSTRACT

A system is provided for automatically generating and displaying market analysis related to financial assets whereby the analysis is provided for substantially all financial assets. The system includes a computer, database accessible by the computer and having stored thereon historical and real time data relating to a financial asset, and software executing on the computer for generating and displaying market analysis. The market analysis may, but not necessarily, include historical and real time data, a measure of liquidity and volatility of a financial asset, a measure of a financial asset's historical performance, an analysis of a financial asset's return in relation to its risk, and computed correlation coefficients and analysis of relationships between a financial asset and its market or market sectors.

52 Claims, 3 Drawing Sheets

| QUICK QUOTE: HWP | | | |
|---|---|---|---|
| LAST PRICE | 112 3/4 | PREV CLOSE | 113 |
| PRICE CHANGE | -1/4 (-0.22%) | TODAY'S RANGE | 110 7/8 - 114 1/8 |
| VOLUME | 2,238,420 | AVERAGE VOLUME | 3,291,033 |
| BID (SIZE) | 112 3/4 * 100 | ASK (SIZE) | 112 7/8 * 100 |
| EARNING/SHR | 3.06 | P/E | 37 |
| LAST TRADE | 7/24/1999 2:01 PM | MARKET CAP | 117.78 |
| 52-WK RANGE | 47 - 113 3/16 | OPEN | 113 1/16 |

HEWLETT-PACKARD COMPANY DESIGNS, MANUFACTURES AND SERVICES PRODUCTS AND SYSTEMS FOR MEASUREMENT, COMPUTATION AND COMMUNICATIONS, AND OFFERS SYSTEMS INTEGRATION, OUTSOURCING, CONSULTING, EDUCATION, FINANCING, CUSTOMER SUPPORT AND OTHER SERVICES. HWP IS A MEMBER OF THE DOW JONES INDEX.

REAL-TIME COMMENTS:

HWP IS CURRENTLY IN A MAJOR UP TREND. IN THE LAST THREE MONTHS IT SHOWS A DAILY VOLATILITY OF $2.3 PER DAY. IT IS A VERY LIQUID STOCK WITH RATHER HIGH VOLATILITY, THEREFORE, A GOOD CANDIDATE FOR DAY TRADING. OUR ARTIFICIAL INTELLIGENCE STOCK PRICE PREDICTION MODEL THINKS THAT HWP IS OVERBOUGHT BUT STILL OFFERS FAR ABOVE AVERAGE RETURN/RISK POTENTIAL AND GIVES IT A SHORT TERM BUY RATING.

WANT TO SEE TOMORROW'S PRICE FOR HWP? CLICK HERE

FIG. 3

AUTOMATED ANALYSIS FOR FINANCIAL ASSETS

This application is a continuation-in-part of U.S. Provisional Application No. 60/149,066, filed Aug. 16, 1999.

FIELD OF THE INVENTION

The invention relates to a system for providing analysis for financial assets and, more particularly, to a system for providing timely analysis and advice for financial assets.

BACKGROUND OF THE INVENTION

Trading stocks, bonds, securities, commodities, and other liquidities has generally been done through brokers or traders who buy/sell on behalf of investors. Investors typically have had to rely upon the advice of traders or brokers in making investment decisions. Investors who wanted to invest for themselves, thereby avoiding paying broker fees, were usually faced with the need to gather financial news from the ever changing worldwide market. Further, gathering financial news from the wide spectrum of worldwide markets can be monotonous and time consuming. Moreover, investors were typically discouraged from doing so because there was a lack of information about how to efficiently engage in the process since brokers or traders would not provide investors with assistance, for that would mean cutting themselves out of the trading process and, therefore, their commission. Hence, investors traditionally used traders or brokers until the advent of on-line trading websites that facilitated the self-trading process for investors.

Trading stocks, bonds, securities, commodities, and other liquidities on the Internet provides a tremendous benefit to investors for it is more convenient and makes buying and selling easier for the investor. On-line trading sites also provide instructions and investment advice to help investors use the sites to buy/sell their assets without the need for traders or brokers.

Although on-line trading websites facilitate buying/selling financial assets, they often lack adequate investment decision making advice for the advice typically does not include an in-depth analysis of the viability of specific financial assets. Further, even if in-depth analysis is provided, the analysis generally does not cover most stocks. Moreover, the advice provided often is not timely for a significant amount of time generally lapses during the process of gathering information, compiling it, and posting it on the web site.

Traditional methods require time for evaluation by persons who must examine information and generate reports for investors. Such persons may further choose to evaluate assets of only large companies or for companies of interest at the evaluator's discretion, not at the desirable investor's discretion. Even if evaluations are made at an investor's discretion, the time involved in documenting the evaluation and posting it for investors may detrimentally affect the value of the information.

Such inadequate and untimely and, therefore, unreliable investment advice can have detrimental consequences to investors. In addition to negatively affecting an investor's decision making process regarding his current portfolio of financial assets, unreliable advice can also have unfavorable effects on his decisions to purchase prospective financial assets.

What is desired, therefore, is a system to provide in-depth analyses for a wide variety of financial assets. What is also desired is a system to provide timely commentary for financial assets. What is further desired is to provide a web page where the commentary automatically updates on a real time basis.

SUMMARY OF THE INVENTION

Accordingly, it is an object of the invention to automatically provide market commentary for all desirable financial assets on a web page.

Another object of the invention is to automatically provide timely updates to the market commentary on a real time basis.

These and other objects of the invention are achieved by a system for automatically providing market commentary relating to financial assets whereby the commentary is provided for substantially all financial assets. The system includes a computer, a database accessible by the computer and having stored thereon historical data relating to a financial asset, and software executing on the computer for automatically generating market commentary. The market commentary may, but not necessarily, include historical data, a feed of real time data, a measure of volatility of a financial asset, a measure of a financial asset's historical performance, an analysis of a financial asset's return in relation to its risk, and computed correlation coefficients and analysis of relationships between a financial asset and its market or market sectors.

The system may further include software for automatically updating the historical data, feed of real time data, the measure of volatility, the measure of a financial asset's historical performance, the analysis of a financial asset's return in relation to its risk, the computed correlation coefficients and analysis of relationships between a financial asset and its market or market sectors, and the market commentary on a real time basis.

The system may further provide the market commentary on a single web page and filter the retrieved historical and real time data in order to provide relevant information related to the desired financial asset.

In another embodiment, the system may include an indicator of a financial asset's strength in addition to, or instead of, computed correlation coefficients and analysis of relationships between a financial asset and its market or market sectors. Thereafter, market commentary may include the indicator of the asset's strength. This is desirable where an investor is more interested in market commentary having editorials and comments related to a financial asset's strength.

In another embodiment, the system may include forecasts of a financial asset's performance and confidence bands in addition to, or instead of, an indicator of an asset's strength or correlation coefficients. Thereafter, market commentary may include the forecasts. This is desirable where an investor is more interested in market commentary having editorials and comments related to an asset's predicted future performance and accuracy of such prediction.

In another embodiment, the system may include a determination as to whether or not a financial asset's historical performance matches known, typical patterns in addition to, or instead of, an indicator of strength, correlation coefficient, or forecast. Thereafter, market commentary may include the determination as to the similarities between the asset and known patterns. This is desirable where an investor is more interested in the market commentary having editorials and comments related to an asset's future performance based upon known models in the market.

In another aspect, the invention includes a method for automatically providing commentary relating to financial assets. The method includes providing a computer, storing historical data of a financial asset on a database accessible by the computer, retrieving the historical data, retrieving a feed of real time data relating to the financial asset, generating a measure of historical performance of a financial asset based upon the historical data, evaluating a rate of return of a financial asset based upon the historical data, analyzing a relationship between the asset and market, and automatically generating market commentary. The market commentary may, but not necessarily, be based upon the historical data, feed of real time data, a measure of volatility of a financial asset, a measure of a financial asset's historical performance, an analysis of a financial asset's return in relation to its risk, and computed correlation coefficients and analysis of relationships between a financial asset and its market or market sectors.

The method may further include automatically updating the historical data, feed of real time data, the measure of volatility, the measure of a financial asset's historical performance, the analysis of a financial asset's return in relation to its risk, the computed correlation coefficients and analysis of relationships between a financial asset and its market or market sectors, and the market commentary on a real time basis.

In another aspect, the method may include computing an indicator of a financial asset's strength in addition to, or instead of, computing correlation coefficients and analysis of relationships between a financial asset and its market or market sectors. Thereafter, market commentary may include the indicator of the asset's strength. This is desirable where an investor is more interested in market commentary having editorials and comments related to a financial asset's strength.

In another aspect, the method may include forecasting of a financial asset's performance and confidence bands in addition to, or instead of, computing an indicator of an asset's strength or correlation coefficients. Thereafter, market commentary may include the forecasts. This is desirable where an investor is more interested in market commentary having editorials and comments related to an asset's predicted future performance and accuracy of such prediction.

In another aspect, the method may include a determination as to whether or not a financial asset's historical performance matches known, typical patterns in addition to, or instead of, an indicator of strength, correlation coefficient, or forecast. Thereafter, market commentary may include the determination as to the similarities between the asset and known patterns. This is desirable where an investor is more interested in the market commentary having editorials and comments related to an asset's future performance based upon known models in the market.

The invention and its particular features and advantages will become more apparent from the following detailed description considered with reference to the accompanying drawings.

BRIEF DESCRIPTION OF THE DRAWINGS

FIG. 3 is a diagram of a web page having the commentary relating to financial assets.

DETAILED DESCRIPTION OF THE DRAWINGS

Figure 1:
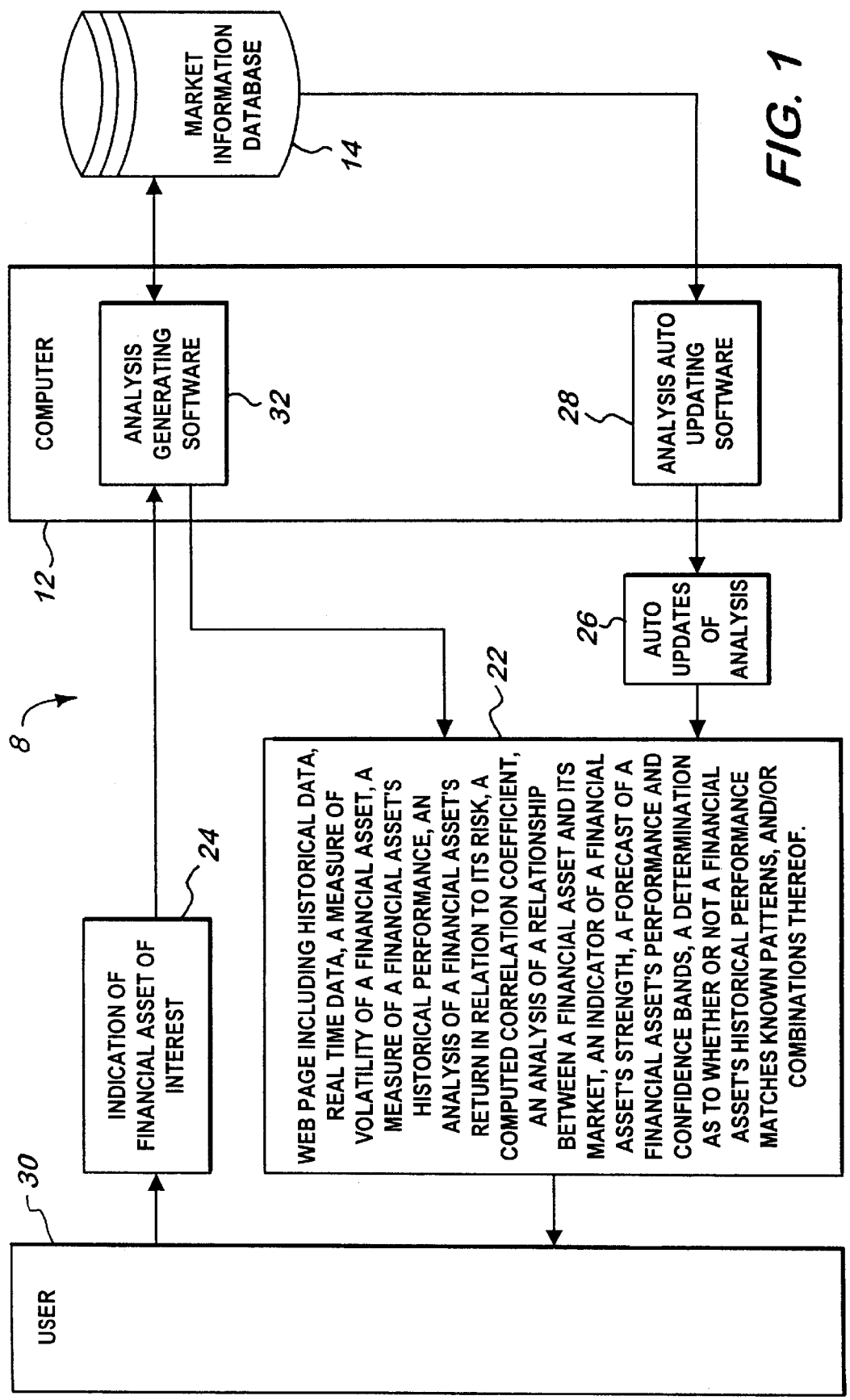
FIG. 1 is a schematic block diagram of a system for automatically providing commentary relating to financial assets.

FIG. 1 depicts a system 8 for providing commentary relating to financial assets whereby the system comprises a computer 12, database 14 accessible by the computer, and software executing on the computer for retrieving data from the database and automatically generating commentary.

Database 14 comprises historical data stored thereon. The historical data includes information relating to financial assets. The information further includes any data related to financial assets, such as archived or recent historical data as well as market, domestic, and international news. The historical data further includes quotes, trends, gains, and losses of any financial asset.

Software executing on computer 12 stores and retrieves historical data stored on database 14. Software further retrieves a feed of real time data relating to financial assets using known manners, such as from an Internet location. Based upon the retrieved data, software generates a measure of volatility of a financial asset. Meaning an indication of a financial asset's risk, or change in a financial asset's market value, is measured. This may include using formulas and historical data to generate a risk factor relevant to the financial market as a whole.

Also based upon the retrieved historical and real time data, software generates a measure of the financial asset's historical performance. This may include analyzing a financial asset's past performance, both long term and short term, in relation to a financial market's past performance.

Also based upon the retrieved historical and real time data, software analyzes a financial asset's return in relation to its risk, including evaluating an asset's gains or losses in comparison with the above calculated risk, or volatility/liquidity. Software further evaluates a financial asset's gains or losses by comparing it with the financial market or sector of the market to which the asset is a part. By doing this, software can make a determination as to the financial asset's stability, which may be more informative as to an asset's fluctuation as opposed to merely looking at it's gains/losses.

Moreover, software further generates and computes correlation coefficients when analyzing relationships between the asset and its market or market sectors. Software generates and computes the correlation coefficients based upon the historical and real time data.

Beta is one example of such a correlation coefficient used to quantify risk and measure risk-adjusted performance when software analyzes the asset with the market. Beta is defined as the linear regression slope of an investment portfolio (or a single investment) compared to a benchmark over a specified period of time. For example, one can compute the Beta of IBM stock with respect to the S&P 500 index over the past six months. One first calculates the time series of the daily percent change of IBM stock prices and the daily percent change of the S&P 500 index; then, one computes the linear regression slope of the two time series. This serves as the measure of a portfolio's risk relative to the market; the meaning is straightforward: on average, if the index moves 1 percent, then the stock moves Beta percent.

Another example of a correlation coefficient generated by software is value-at-risk ("VAR"), nowadays becoming increasingly popular. VAR is an absolute risk measure for a portfolio, in units of dollars per day. A typical model for calculating VAR uses the daily 95% confidence definition: this formulation assumes that in a single trading day, there is a 95% probability that the portfolio will not lose more than VAR. For example, if the VAR value is $800, then one can assume that it is 95% certain that the portfolio will not lose more than $800 in one day. It should be noted that a small VAR number does not guarantee that one cannot lose more than VAR; it only says that, most likely—with 95% confidence—one will not lose more than VAR in one day. The calculation of VAR requires the study of the price time series of all the stocks in a portfolio. VAR depends on many factors, such the volatility of each stock, the correlation among all the stocks, and the stability of their historical relationships.

Still another risk management concept is the Sharpe ratio, which is a risk-adjusted measure of return that divides a portfolio's return in excess of the riskless return by the portfolio's standard deviation. To calculate a portfolio's Sharpe ratio, its returns in excess of the 90-day T-bill are divided by the standard deviation of those returns. For example, if a portfolio produced a return of 25% with a standard deviation of 10%, while the T-bill returned 5%, its Sharpe ratio would equal 2.0. The higher its Sharpe ratio, the better a fund's returns have been relative to the amount of investment risk it has taken. It is easy to see this relationship between risk and return: The higher a fund's standard deviation, the larger the denominator of the Sharpe ratio equation—therefore, the higher the numerator (excess returns) must be for the fund to have a large Sharpe ratio. Conversely, a fund with mild returns will have a relatively small numerator, but if its volatility is low enough, a small denominator can result in a large Sharpe ratio.

While the above methods, concepts and measurements of market Beta, VAR and Sharpe ratio, along with other methods for quantifying a portfolio's risk, have long been known, their use has been limited to brokers and extremely sophisticated investors. Even if these methods were available to individual investors, they are complicated, require extensive knowledge to employ, and require a significant amount of time to continually update as the investor's portfolio changes. All known online trading systems suffer from a disadvantage in that they provide no mechanism by which a typical online individual investor can easily and efficiently manage the risk of his/her investment portfolio.

To overcome this, and other, disadvantages of prior art systems, software uses the retrieved historical and real time data pertaining to the desired financial assets to calculate and display to user on web page 22 risk evaluation information. Risk evaluation information comprises correlation coefficients such as Beta, VAR, Sharpe ratio, and/or other appropriate coefficients of risk. These risk indicators are automatically computed without requiring user input or intervention, and are automatically recalculated and redisplayed in real time.

In addition, software executing on computer 12 also generates and computes indicators of a financial asset's strength in order to analyze the asset's market value and determine if the asset is overbought or oversold. Such indicators are based upon the historical and real time data and include, but are not limited to, Relative Strength Indicator ("RSI") and Stochastic Indicators K and D ("K/D"). The indicators are automatically updated in real time by software and are generated and computed without user intervention.

Software further computes forecasts of a financial asset's performance and confidence bands, or upper and lower prediction limits of the forecasts. The confidence bands impart the confidence level, or degree of certainty, associated with the forecast of which it is a part. Software may use an algorithm or formula in conjunction with historical and real time data.

In addition to providing forecasts and confidence bands, software, based upon historical and real time data, determines whether or not a financial asset's historical performance matches known patterns. Based upon the amount of similarities, software may provide a prediction of a financial asset's performance. Software may further consider the degree of similarity when predicting the performance. Software may also include the effects the similarities or dissimilarities in its prediction in addition to, or instead of, the accuracy of the financial asset's prediction.

Software 32 executing on computer 12 automatically generates market commentary, which includes editorials/comments in addition to, or instead of, gathering the above information for display on web page 22. Editorials and comments include opinions as to market behavior or patterns in market fluctuations. Such markets include both domestic and international markets, as both may affect an investment's performance. In addition, editorials and comments may include advice as to risky investments, both short and long term, and recommendations for the best times to buy or sell assets.

Market commentary may further include explanations as to highs or lows in an investment's performance and may be further customized to provide information unique to a financial asset, or plurality of financial assets, displayed on web page 22. Market commentary includes advice as to whether or not a financial asset is suitable for an investor given his conservative or aggressive investment portfolio. Hence, user 30 may display information concerning the financial assets he/she owns, or is interested in purchasing, and market commentary may be related to such financial assets, whereby a different user with different assets displayed may have different market commentary. For example, market commentary may advise user 30 to buy domestic real estate stocks, in addition to the ones user 30 owns, now because Chairman Alan Greenspan will speak tomorrow and is expected to drop interest rates, thereby prompting a sharp increase in real estate stock value. Another example of market commentary may be advice to sell agricultural commodities currently owned because, based on prior performance, these commodities tend to tumble in value during this time of the year. Market commentary may also include predictions of an asset's or market's performance.

Market commentary includes opinions and/or advice relating to the financial markets and may be based upon, but not limited to, the above historical data, feed of real time data, measure of volatility of a financial asset, measure of a financial asset's historical performance, analysis of a financial asset's return in relation to its risk, computed correlation coefficients and analysis of relationships between a financial asset and its market or market sectors, indicators of a financial asset's strength, forecasts of a financial asset's performance and confidence bands, determination as to whether or not a financial asset's historical performance matches known, typical patterns, and/or combinations thereof. Market commentary does not necessarily require all or a combination of all the above mentioned information to be used.

User 30 may also provide an indication 24 of a financial asset of interest by exercising a buy/sell option thereon web page 22. Software 28 automatically provides updates 26 to market commentary on a real time basis and provides user 30 with substantially all information in making investment decisions.

Figure 2:
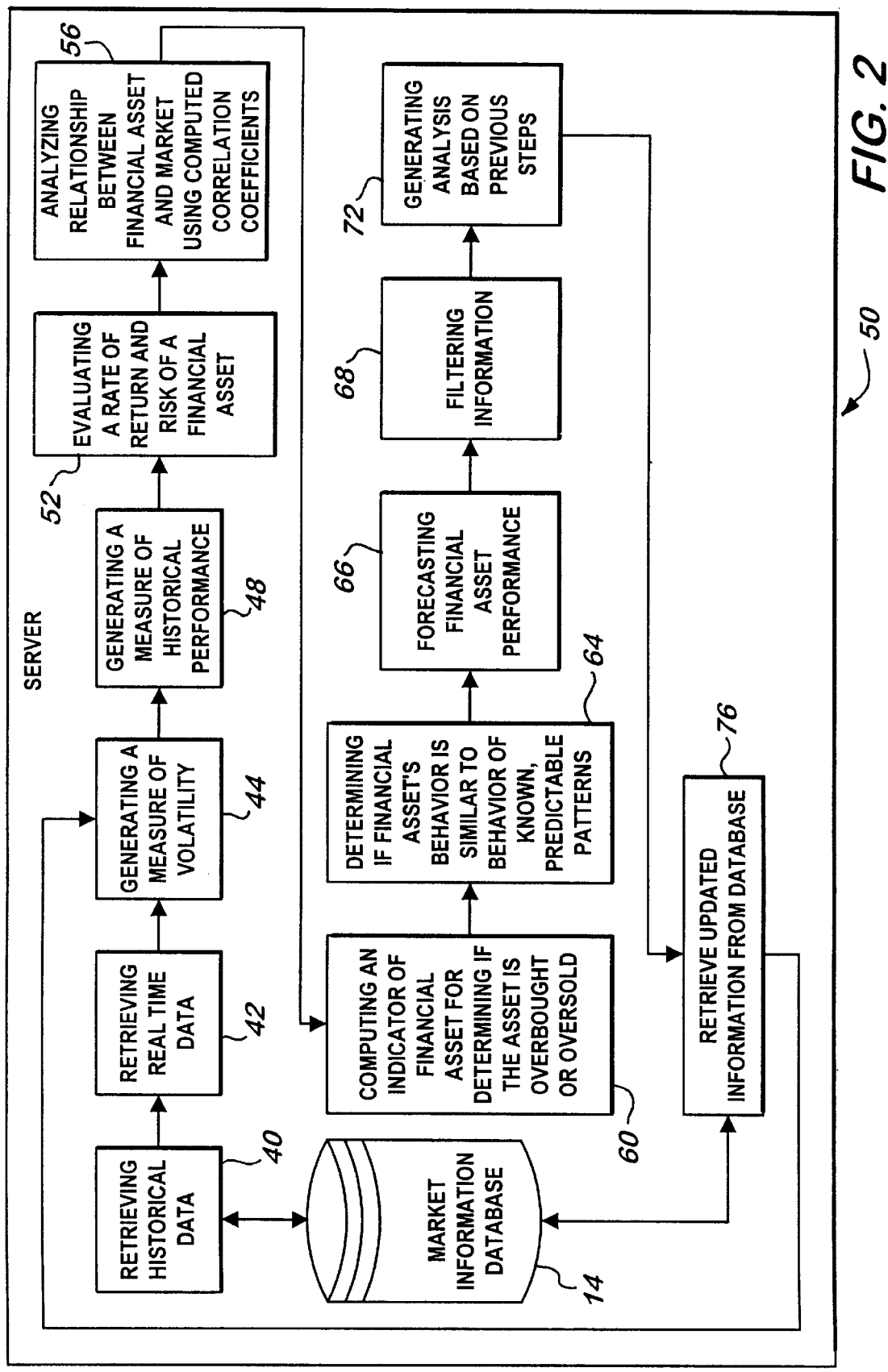
FIG. 2 is a schematic block diagram of a method for automatically providing commentary relating to financial assets.

FIG. 2 depicts method 50 for automatically providing commentary relating to financial assets. The method comprises retrieving 40 historical data from database 14, retrieving 42 a feed of real time data, generating 44 a measure of volatility, generating 48 a measure of historical performance, evaluating 52 a rate of return of a financial asset, analyzing 56 a relationship between a financial asset and a financial market using computed correlation coefficients, computing 60 an indicator of a financial asset's market value, determining 64 if a financial asset's performance is similar to known, predictable patterns, filtering 68 information relevant to a financial asset, generating 72 market commentary based on the previous steps, and retrieving 76 updated information from database 14.

Software executes on computer 12 for storing and retrieving data on database 14. Data may include long term and short term historical data. When generating market commentary, software retrieves 40 the above mentioned data in addition to real time data. Software may further retrieve historical and real time data at consistently timed intervals, such as when retrieving 76 updated information on a real time basis. Software may also retrieve 40 data at sporadic intervals, such as upon user request.

Based upon the retrieved historical and real time data, software generates 44 a measure of volatility for analyzing risks associated with a particular financial asset used in providing commentary. Software may compare a financial asset's market value and historical trading volume with the financial market or market sector when generating 44 a measure of volatility. In addition, a financial asset's past performance may also be compared with the whole market's performance when generating 48 a measure of historical performance. Both short and long term historical performances are analyzed. Software may further automatically update the measure of volatility as well as the measure of historical performance on a real time basis.

Based upon the retrieved historical and real time data, software evaluates 52 a rate of return and risk of a financial asset by comparing an asset's rate of return versus its risk, calculated above using a measure of liquidity and volatility as well as other measures of risk. Software may further automatically update the evaluated rate of return on a real time basis.

Based upon the retrieved historical and real time data, software also analyzes 56 a relationship between a financial asset and financial market using computed correlation coefficients, including, but not limited to, Beta, VAR, and Sharpe ratios. These computed coefficients are used by software for determining how a financial asset's performance compares with that of the market as a whole and may be used in providing market commentary. Software may further automatically update the analyzed relationship between the financial asset and market on a real time basis.

Based upon the retrieved historical and real time data, software may compute 60 indicators of a financial asset's strength to determine if the asset is overbought or oversold in relation to its market value. These indicators may be automatically computed 60 and updated on a real time basis and used in providing market commentary.

Software may further determine 64 if a financial asset is similar, and to what degree of similarity, to any known pattern or performance. Similarities to known patterns facilitates predicting a financial asset's future performance. when determining 64 similarities, software may automatically update its determination on a real time basis and use the retrieved historical and real time data.

Based upon the retrieved historical and real time data, software automatically generates 72 market commentary relating to a financial asset or market. Market commentary includes editorials/comments in addition to, or instead of, gathering the above information for display on web page 22. Market commentary includes opinions as to market behavior or patterns in market fluctuations. Such markets include both domestic and international markets, as both may affect an investment's performance. In addition, editorials and comments may include explanations as to highs or lows in an investment's performance and may be further customized to provide information unique to a financial asset, or plurality of financial assets, displayed on web page 22. Hence, user 30 may display information concerning the financial assets he/she owns, or is interested in purchasing, and market commentary may be related to such financial assets, whereby a different user with different assets displayed may have different market commentary.

Market commentary includes opinions and/or advice relating to the financial markets and may be based upon, but not limited to, the above historical and real time data, measure of volatility of a financial asset, measure of a financial asset's historical performance, analysis of a financial asset's return in relation to its risk, computed correlation coefficients and analysis of relationships between a financial asset and its market or market sectors, indicators of a financial asset's strength, forecasts of a financial asset's performance and confidence bands, determination as to whether or not a financial asset's historical performance matches known, typical patterns, and/or combinations thereof. Market commentary does not necessarily require all or a combination of all the above mentioned information to be used.

Software may also retrieve 76 updated information from database 14 when updating, in part or in whole, market commentary.

FIG. 3 more particularly depicts web page 22 for automatically generating commentary for financial assets. Web page 22 may include indications 80 of a financial asset's historical performance, market commentary 20, and links 82 to other desirable information.

Indications 80 of a financial asset's historical performance may include displaying historical and real time data such as a price, volume, measure of fluctuation, and performance over a time period. Indications 80 of a financial asset's historical performance may also include news related to the financial asset.

Market commentary 20 includes historical data, a feed of real time data, a measure of volatility of a financial asset, a measure of a financial asset's historical performance, an analysis of a financial asset's return in relation to its risk, computed correlation coefficients and analysis of relationships between a financial asset and its market or market sectors, indicators of a financial asset's strength, forecasts of a financial asset's performance and confidence bands, a determination as to whether or not a financial asset's historical performance matches known, typical patterns, and/or combinations thereof. It should be known market commentary 20 does not necessarily require all or a combination of all the above mentioned information.

Links 82 to other desirable information includes forecasting and news links related to the financial asset or to other assets or markets. Links 82 also includes lists of heavily traded assets and explanations/assistance for an investor.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for automatically providing analysis relating to financial assets, comprising:
   a computer;
   a database accessible by said computer, said database having stored thereon historical data relating to a financial asset;
   a feed of real time data relating to the financial asset; and
   software executing on said computer for automatically computing an indicator of the financial asset's strength for determining the financial asset's market value;
   software executing on said computer for automatically computing a correlation coefficient for analyzing a relationship between the financial asset and a financial market, wherein said correlation coefficient is selected from the group consisting of beta, value-at-risk, sharpe ratio, and combinations thereof; and
   software executing on said computer for automatically generating analysis based upon the historical data, real time data, the computation of a correlation coefficient, the indicator of the financial asset's strength, the determination as to whether or not the financial asset's performance is generally similar to any predictable pattern, and the prediction of future performance.

2. The system according to claim 1, wherein the analysis further comprises a recommendation as to a particular time for selling/buying a financial asset.

3. The system according to claim 1, wherein the analysis further comprises a recommendation as to whether the financial asset is appropriate for short term trading.

4. The system according to claim 1, wherein the analysis further comprises a recommendation as to whether the financial asset is appropriate for long term trading.

5. The system according to claim 1, wherein the analysis further comprises a recommendation as to whether the financial asset is a high/low risk for trading.

6. The system according to claim 1, wherein the analysis further comprises a recommendation as to whether the financial asset is appropriate for a certain type of investor.

7. The system according to claim 1, wherein the analysis further comprises a prediction of a financial asset's performance.

8. The system according to claim 1, wherein the analysis is a prediction of a financial market's performance.

9. A system for automatically providing analysis relating to financial assets, comprising:
   a computer;
   a database accessible by said computer, said database having stored thereon historical data relating to a financial asset;
   a feed of real time data relating to the financial asset;
   software executing on said computer for automatically generating a measure of volatility of the financial asset based upon the historical data;
   software executing on said computer for automatically generating a measure of historical performance of the financial asset based upon the historical data;
   software executing on said computer for automatically evaluating a rate of return of the financial asset based upon the historical data;
   software executing on said computer for automatically computing a correlation coefficient for analyzing a relationship between the financial asset and a financial market, wherein said correlation coefficient is selected from the group consisting of beta, value-at-risk, sharpe ratio, and combinations thereof; and
   software executing on said computer for automatically generating analysis based upon the historical data, feed of real time data, the measure of volatility, the measure of historical performance, the rate of return, and the relationship between the financial asset and financial market.

10. The system according to claim 9, further comprising software executing on said computer for automatically updating the historical data, feed of real time data, the measure of volatility, the measure of historical performance, the rate of return, the relationship between the financial asset and financial market, and the analysis on a real time basis.

11. The system according to claim 9, further comprising software executing on said computer for automatically computing an indicator of the financial asset's strength for determining the financial asset's market value; software executing on said computer for automatically determining whether or not the financial asset's performance is generally similar to any predictable pattern; and software executing on said computer for automatically predicting future performance of the financial asset.

12. The system according to claim 11, further comprising software executing on said computer for automatically updating the computation of the indicator, the determination as to whether or not the financial asset's performance is generally similar to any predictable pattern, and the prediction of a future performance of the financial asset on a real time basis.

13. The system according to claim 9, wherein said analysis is on a single web page.

14. The system according to claim 9, wherein said analysis further comprises filtered information relevant to the financial asset.

15. A system for automatically providing analysis relating to financial assets, comprising:
   a computer;
   a database accessible by said computer, said database having thereon historical data relating to a financial asset;
   a feed of real time data relating to the financial asset;
   software executing on said computer for automatically generating a measure of volatility of the financial asset based upon the historical data;
   software executing on said computer for automatically generating a measure of historical performance of the financial asset based upon the historical data;
   software executing on said computer for automatically evaluating a rate of return of the financial asset based upon the historical data;
   software executing on said computer for automatically computing an indicator of the financial asset's strength for determining the financial asset's market value based upon the historical data;
   software executing on said computer for automatically computing a correlation coefficient for analyzing a relationship between the financial asset and a financial market, wherein said correlation coefficient is selected from the group consisting of beta, value-at-risk, sharpe ratio, and combinations thereof;
   software executing on said computer for automatically generating analysis based upon the historical data, feed of real time data, the measure of volatility, the measure of historical performance, the rate of return, the indicator of the financial asset's strength, and the analysis of the relationship between the financial asset and financial market.

16. The system according to claim 15, further comprising software executing on said computer for automatically updating the historical data, feed of real time data, the measure of volatility, the measure of historical performance, the rate of return, the indicator, the analysis of the relationship between the financial asset and financial market through use of computed correlation coefficients, the determination as to whether or not the financial asset's performance is generally similar to any predictable pattern, and the prediction of future performance of the financial asset on a real time basis.

17. The system according to claim 15, wherein said analysis is on a single web page.

18. The system according to claim 15, wherein said analysis further comprises filtered information relevant to the financial asset.

19. A system for automatically providing analysis relating to financial assets, comprising:
- a computer;
- a database accessible by said computer, said database having stored thereon historical data relating to a financial asset;
- a feed of real time data relating to the financial asset;
- software executing on said computer for automatically generating a measure of volatility of the financial asset based upon the historical data;
- software executing on said computer for automatically generating a measure of historical performance of the financial asset based upon the historical data;
- software executing on said computer for automatically evaluating a rate of return of the financial asset based upon the historical data;
- software executing on said computer for automatically computing a correlation coefficient for analyzing a relationship between the financial asset and a financial market, wherein said correlation coefficient is selected from the group consisting of beta, value-at-risk, sharpe ratio, and combinations thereof;
- software executing on said computer for automatically determining whether or not the financial asset's performance is generally similar to any predictable pattern based upon the historical data; and
- software executing on said computer for automatically generating analysis based upon the historical data, feed of real time data, the measure of liquidity and volatility, the measure of historical performance, the rate of return and risk, the analysis of the relationship between the financial asset and financial market, and the determination as to whether or not the financial asset's performance is generally similar to any predictable pattern.

20. The system according to claim 19, further comprising software executing on said computer for automatically updating the historical data, feed of real time data, the measure of volatility, the measure of historical performance, the rate of return, the determination as to whether or not the financial asset's performance is generally similar to any predictable pattern, and the analysis on a real time basis.

21. The system according to claim 19, further comprising software executing on said computer for automatically computing an indicator of the financial asset's strength for determining the financial asset's market value; software executing on said computer for automatically analyzing a relationship between the financial asset and a financial market through use of computed correlation coefficients; and software executing on said computer for automatically predicting a future performance of the financial asset.

22. The system according to claim 21, further comprising software executing on said computer for automatically updating the computation of the indicator, the analysis of the relationship, and the prediction of future performance of the financial asset on a real time basis.

23. The system according to claim 19, wherein said analysis is on a single web page.

24. The system according to claim 19, wherein said analysis further comprises filtered information relevant to the financial asset.

25. A system for automatically providing analysis relating to financial assets, comprising:
- a computer;
- a database accessible by said computer, said database having stored thereon historical data relating to a financial asset;
- a feed of real time data relating to the financial asset;
- software executing on said computer for automatically generating a measure of volatility of the financial asset based upon the historical data;
- software executing on said computer for automatically generating a measure of historical performance of the financial asset based upon the historical data;
- software executing on said computer for automatically computing a correlation coefficient for analyzing a relationship between the financial asset and a financial market, wherein said correlation coefficient is selected from the group consisting of beta, value-at-risk, sharpe ratio, and combinations thereof; and
- software executing on said computer for automatically generating a prediction of future performance of the financial asset based upon the historical data; and
- software executing on said computer for automatically generating analysis based upon the historical data, feed of real time data, the measure of volatility, the measure of historical performance, the rate of return, the analysis of the relationship between the financial asset and financial market, and the prediction of future performance of the financial asset.

26. The system according to claim 25, further comprising software executing on said computer for automatically updating the historical data, feed of real time data, the measure of volatility, the measure of historical performance, the rate of return, the prediction of future performance of the financial asset, and the analysis on a real time basis.

27. The system according to claim 25, further comprising software executing on said computer for automatically computing an indicator of the financial asset's strength for automatically determining the financial asset's market value; software executing on said computer for determining whether or not the financial asset's performance is generally similar to any predictable pattern; and software executing on said computer for automatically analyzing a relationship between the financial asset and financial market through use of computed correlation coefficients.

28. The system according to claim 27, further comprising software executing on said computer for automatically updating the computation of the indicator, the determination as to whether or not the financial asset's performance is generally similar to any predictable pattern, and the analysis of the relationship between the financial asset and financial market on a real time basis.

29. The system according to claim 25, wherein said analysis is on a single web page.

30. The system according to claim 25, wherein said analysis further comprises filtered information relevant to the financial asset.

31. A method for automatically providing analysis relating to financial assets, comprising:
    providing a computer;
    storing historical data of a financial asset on a database accessible by said computer;
    retrieving historical data of the financial asset stored on said database;
    retrieving a feed of real time data relating to the financial asset;
    generating a measure of volatility of the financial asset based upon the historical data;
    generating a measure of historical performance of the financial asset based upon the historical data;
    evaluating a rate of return of the financial asset based upon the historical data;
    automatically analyzing a relationship between the financial asset and a financial market based upon a computed correlation coefficient selected from the group consisting of beta, value-at-risk, sharpe ratio, and combinations thereof; and
    automatically generating analysis based upon the historical data stored on said database, feed of real time data, the measure of volatility, the measure of historical performance, the rate of return, and the relationship between the financial asset and financial market.

32. The method according to claim 31, further comprising the step of automatically updating the historical data, feed of real time data, the measure of volatility, the measure of historical performance, the rate of return, the relationship between the financial asset and financial market, and the analysis on a real time basis.

33. The method according to claim 31, further comprising the step of automatically computing an indicator of the financial asset's strength for determining the financial asset's market value; automatically determining whether or not the financial asset's performance is generally similar to any predictable pattern; and automatically predicting future performance of the financial asset.

34. The method according to claim 31, further comprising the step of automatically updating the computation of the indicator, the determination as to whether or not the financial asset's performance is generally similar to any predictable pattern, and the prediction of a future performance of the financial asset on a real time basis.

35. The method according to claim 31, further comprising the step of automatically providing said analysis on a single web page.

36. The method according to claim 31, further comprising the step of automatically filtering information relevant to the financial asset.

37. A method for automatically providing analysis relating to financial assets, comprising:
    providing a computer;
    storing historical data of a financial asset on a database accessible by said computer;
    retrieving historical data of the financial asset stored on said database;
    retrieving a feed of real time data relating to the financial asset;
    generating a measure of volatility of the financial asset based upon the historical data;
    generating a measure of historical performance of the financial asset based upon the historical data;
    evaluating a rate of return of the financial asset based upon the historical data;
    automatically computing an indicator of the financial asset's strength for determining the financial asset's market value based upon the historical and real time data;
    automatically analyzing a relationship between the financial asset and a financial market based upon computed correlation coefficients selected from the group consisting of beta, value-at-risk, sharpe ratio, and combinations thereof;
    automatically determining whether or not the financial asset's performance is generally similar to any predictable pattern; and
    generating analysis based upon the historical data, feed of real time data, the measure of volatility, the measure of historical performance, the rate of return, the indicator of the financial asset, the analysis of the relationship between the financial asset and financial market, the determination as to whether or not the financial asset's performance is generally similar to any predictable pattern, and the prediction of future performance of the financial asset.

38. The method according to claim 37, further comprising the step of automatically updating the historical data, feed of real time data, the measure of volatility, the measure of historical performance, the rate of return, the indicator, the analysis of the relationship between the financial asset and financial market through use of computed correlation coefficients, the determination as to whether or not the financial asset's performance is generally similar to any predictable pattern, and the prediction of future performance of the financial asset on a real time basis.

39. The method according to claim 37, further comprising the step of automatically providing said analysis on a single web page.

40. The method according to claim 37, further comprising the step of automatically filtering information relevant to the financial asset.

41. A method for automatically providing analysis relating to financial assets, comprising:
    providing a computer;
    storing historical data of a financial asset on a database accessible by said computer;
    retrieving historical data of the financial asset stored on said database;
    retrieving a feed of real time data relating to the financial asset;
    generating a measure of volatility of the financial asset based upon the historical data;
    generating a measure of historical performance of the financial asset based upon the historical data;
    evaluating a rate of return of the financial asset based upon the historical data;
    automatically analyzing a relationship between the financial asset and a financial market based upon a computed correlation coefficient selected from the group consisting of beta, value-at-risk, sharpe ratio, and combinations thereof; and
    generating analysis based upon the historical data, feed of real time data, the measure of volatility, the measure of historical performance, the rate of return, the indicator of the financial asset, and the analysis of the relationship between the financial asset and financial market.

42. The method according to claim 41, further comprising the step of automatically updating the historical data, feed of real time data, the measure of volatility, the measure of historical performance, the rate of return, the determination as to whether or not the financial asset's performance is generally similar to any predictable pattern, and the analysis on a real time basis.

43. The method according to claim 41, further comprising the step of automatically computing an indicator of the financial asset's strength for determining the financial asset's market value; automatically analyzing a relationship between the financial asset and a financial market through use of computed correlation coefficients; and automatically predicting a future performance of the financial asset.

44. The method according to claim 41, further comprising the step of automatically updating the computation of the indicator, the analysis of the relationship, and the prediction of future performance of the financial asset on a real time basis.

45. The method according to claim 41, further comprising the step of automatically providing said analysis on a single web page.

46. The method according to claim 41, further comprising the step of automatically filtering information relevant to the financial asset.

47. A method for automatically providing analysis relating to financial assets, comprising:

providing a computer;

storing historical data of a financial asset on a database accessible by said computer;

retrieving historical data of the financial asset stored on said database;

retrieving a feed of real time data relating to the financial asset;

generating a measure of volatility of the financial asset based upon the historical data;

generating a measure of historical performance of the financial asset based upon the historical data;

evaluating a rate of return of the financial asset based upon the historical data; and automatically analyzing a relationship between the financial asset and a financial market based upon a computed correlation coefficient selected from the group consisting of beta, value-at-risk, sharpe ratio, and combinations thereof;

predicting future performance of the financial asset based upon the historical data; and automatically generating analysis based upon the historical data, feed of real time data, the measure of volatility, the measure of historical performance, the rate of return, the analysis of the relationship between the financial asset and financial market, and the prediction of future performance of the financial asset.

48. The method according to claim 47, further comprising the step of automatically updating the historical data, feed of real time data, the measure of volatility, the measure of historical performance, the rate of return, the prediction of future performance of the financial asset, and the analysis on a real time basis.

49. The method according to claim 47, further comprising the step of automatically computing an indicator of the financial asset's strength for determining the financial asset's market value; automatically determining whether or not the financial asset's performance is generally similar to any predictable pattern; and automatically analyzing a relationship between the financial asset and financial market through use of computed correlation coefficients.

50. The method according to claim 47, further comprising the step of automatically updating the computation of the indicator, the determination as to whether or not the financial asset's performance is generally similar to any predictable pattern, and the analysis of the relationship between the financial asset and financial market on a real time basis.

51. The method according to claim 47, further comprising the step of automatically providing said analysis on a single web page.

52. The method according to claim 47, further comprising the step of automatically filtering information relevant to the financial asset.

* * * * *